US008217755B2

(12) United States Patent
Martin et al.

(10) Patent No.: US 8,217,755 B2
(45) Date of Patent: Jul. 10, 2012

(54) VEHICLE WITH CONTROLLED DOOR OPERATION

(75) Inventors: Roger J. Martin, Toronto (CA); Mark S. Mull, Toronto (CA); Richard J. Hellinga, Toronto (CA); Chris K. Derbecker, Toronto (CA); Mike A. G. Johnson, Toronto (CA); Ray J. Minato, Toronto (CA); Markus A. Hetzler, Toronto (CA); Scott J. Vader, Toronto (CA)

(73) Assignee: Unicell Limited, Toronto (CA)

( * ) Notice: Subject to any disclaimer, the term of this patent is extended or adjusted under 35 U.S.C. 154(b) by 785 days.

(21) Appl. No.: 12/232,707

(22) Filed: Sep. 23, 2008

(65) Prior Publication Data

US 2010/0073131 A1 Mar. 25, 2010

(51) Int. Cl.
*G08B 29/00* (2006.01)
*G05B 19/00* (2006.01)
*G06F 7/00* (2006.01)

(52) U.S. Cl. .................... 340/5.72; 180/289; 280/6.152; 296/146.4; 340/426.13; 340/430; 701/36

(58) Field of Classification Search .................. 180/271, 180/281, 286, 289; 280/5.151, 6.152, 6.157; 296/146.1, 146.4, 155; 340/5.1, 5.2, 5.6–5.67, 340/5.7, 5.72, 425.5, 426.13, 426.17, 426.24, 340/426.25, 441; 414/467, 471, 539, 540; 701/1, 2, 37, 48, 49
See application file for complete search history.

(56) References Cited

U.S. PATENT DOCUMENTS

| | | | | |
|---|---|---|---|---|
| 1,388,416 | A * | 8/1921 | Thomas | 105/341.5 |
| 3,386,685 | A * | 6/1968 | Judd | 244/171.9 |
| 4,354,189 | A | 10/1982 | Lemelson | |
| 4,422,521 | A | 12/1983 | Mochida | |
| 4,481,887 | A * | 11/1984 | Urbano | 109/3 |
| 4,763,121 | A | 8/1988 | Tomoda et al. | |
| 4,851,746 | A * | 7/1989 | Milke | 318/467 |
| 4,939,434 | A * | 7/1990 | Elson | 318/285 |
| 5,005,664 | A * | 4/1991 | Hoffmann | 180/287 |
| 5,056,847 | A | 10/1991 | Stillwell et al. | |
| 5,344,189 | A | 9/1994 | Tanaka et al. | |
| 5,357,143 | A * | 10/1994 | Lehr et al. | 307/10.1 |
| 5,369,911 | A | 12/1994 | Fortunato | |
| 5,532,521 | A * | 7/1996 | Leininger | 307/10.2 |
| 5,552,789 | A | 9/1996 | Schuermann | |
| 5,929,769 | A | 7/1999 | Garnault | |
| 6,034,617 | A | 3/2000 | Luebke et al. | |
| 6,046,562 | A * | 4/2000 | Emil | 318/484 |
| 6,075,460 | A | 6/2000 | Minissale et al. | |
| 6,236,333 | B1 | 5/2001 | King | |
| 6,293,050 | B1 | 9/2001 | Jöhnk | |
| 6,323,565 | B1 * | 11/2001 | Williams et al. | 307/10.1 |

(Continued)

OTHER PUBLICATIONS

Nguyen, An T., USPTO Office Communication dated Dec. 16, 2009 in relation to U.S. Appl. No. 11/566,468 filed Dec. 4, 2006 (21 pages).

(Continued)

*Primary Examiner* — Benjamin C Lee
*Assistant Examiner* — Stephen Burgdorf

(57) ABSTRACT

Doors of a vehicle, such as a delivery vehicle, are controlled based on user inputs. A user may input a vehicle exit mode and stop the vehicle. When an exit mode has been input and the stopping of the vehicle has been sensed, an exit door of the vehicle is opened, with the door being selected based upon said exit mode.

9 Claims, 7 Drawing Sheets

U.S. PATENT DOCUMENTS

| | | | | |
|---|---|---|---|---|
| 6,437,527 | B1 * | 8/2002 | Rhodes et al. | 318/280 |
| 6,583,715 | B1 | 6/2003 | Benzie et al. | |
| 6,634,408 | B2 | 10/2003 | Mays | |
| 6,661,349 | B1 * | 12/2003 | Kuruvilla et al. | 340/691.6 |
| 6,825,628 | B2 * | 11/2004 | Heigl et al. | 318/468 |
| 7,038,409 | B1 * | 5/2006 | Mullet | 318/280 |
| 7,221,273 | B1 * | 5/2007 | Seyfarth | 340/545.1 |
| 7,343,234 | B2 * | 3/2008 | Kameyama | 701/36 |
| 7,417,395 | B2 * | 8/2008 | Edwards et al. | 318/445 |
| 7,637,556 | B2 * | 12/2009 | Haber | 296/146.8 |
| 7,684,915 | B1 * | 3/2010 | Dailey et al. | 701/49 |
| 7,844,377 | B2 * | 11/2010 | Oota et al. | 701/49 |
| 7,868,735 | B2 * | 1/2011 | Nakashima et al. | 340/5.72 |
| 2001/0054952 | A1 * | 12/2001 | Desai et al. | 340/5.72 |
| 2002/0036259 | A1 * | 3/2002 | Agam et al. | 250/221 |
| 2003/0006879 | A1 | 1/2003 | Kang et al. | |
| 2003/0044266 | A1 | 3/2003 | Vandillen et al. | |
| 2003/0222758 | A1 * | 12/2003 | Willats et al. | 340/5.72 |
| 2004/0135531 | A1 * | 7/2004 | Graham et al. | 318/442 |
| 2005/0263337 | A1 * | 12/2005 | Corey et al. | 180/318 |
| 2006/0214769 | A1 * | 9/2006 | Nakashima et al. | 340/5.72 |
| 2008/0036238 | A1 * | 2/2008 | Weeda et al. | 296/146.1 |

OTHER PUBLICATIONS

Nguyen, An T., USPTO Office Communication dated Jul. 26, 2010 in relation to U.S. Appl. No. 11/566,468 filed Dec. 4, 2006 (18 pages).

* cited by examiner

VEHICLE WITH CONTROLLED DOOR OPERATION

BACKGROUND

This invention relates to an approach for controlled door operation of a vehicle.

Delivery trucks and vans are used extensively for the prompt movement of goods. A delivery vehicle may be loaded at a warehouse with packaged goods destined for a number of destinations and then driven along a route that incorporates each of the destinations in order to deliver the goods. Additionally, or alternatively, a delivery vehicle may pick up goods along a route for return to a warehouse or for delivery at another point, or points, along the route.

Given the high cost of labour, a delivery vehicle is typically operated by one person. At a destination point, the operator leaves the driver's seat and may enter the cargo bay of the vehicle in order to retrieve packaged goods for delivery. In a common delivery van configuration, the operator may access the cargo bay either through a bulkhead door between the cab and the cargo bay or via a rear door of the delivery vehicle. The operator will typically choose to enter via the bulkhead door when the packages for delivery may readily be carried. With larger deliveries, the operator will typically access the cargo bay via the rear door and will load the packages (e.g., boxes) onto a hand cart. Similarly, if the operator picks up packages at a destination, he will typically walk them into the cargo bay via the bulkhead (cab to cargo bay) door if they may be readily carried, or will use a hand cart for more voluminous or heavy packages and will load such packages via the rear door of the vehicle.

It will be apparent that the work of moving packages into or out of a delivery vehicle will often require both hands of the operator. In consequence, the operator must interrupt the moving of packages where he/she must open or close an access door of the vehicle. Thus, for example, if the operator returns carrying a package, he/she may be required to set the package down in order to open the rear door or side door and bulkhead door in order to load the package.

Each additional operation that must be undertaken by an operator consumes time, thereby slowing the delivery process. Additionally, each operation of picking up or setting down a package increases operator strain, thereby risking injury and increasing operator fatigue.

Accordingly, an approach to ameliorate any of these problems would be advantageous.

SUMMARY OF INVENTION

Doors of a vehicle, such as a delivery vehicle, are controlled based on user inputs. A user may input a vehicle exit mode and stop the vehicle. When an exit mode has been input and the stopping of the vehicle has been sensed, an exit door of the vehicle is opened, with the door being selected based upon said exit mode.

In accordance with the present invention, there is provided a method of sequenced door operation of a vehicle comprising: receiving an indication of a vehicle exit mode; receiving an indication said vehicle has stopped; after said indication of a vehicle exit mode has been received and said indication said vehicle has stopped has been received, opening a selected exit door of said vehicle based upon said exit mode.

In accordance with another aspect of the present invention, there is provided a system for controlling entry and exit from a vehicle, comprising: a first user interface for setting an exit mode from said vehicle; a second user interface for indicating said vehicle has stopped; a third user interface for indicating an operator has left said vehicle; a drive for opening and closing an exit door of said vehicle; a controller input by said first user interface, said second user interface, and said third user interface and outputting to said drive for: on receipt of an indication from said first user interface of an exit mode and an indication from said second user interface that said vehicle has stopped, controlling said drive to open said exit door.

Other features and advantages will become apparent after a review of the following description and accompanying drawings.

BRIEF DESCRIPTION OF THE DRAWINGS

In the figures which illustrate example embodiments of the invention.

DETAILED DESCRIPTION

Figure 1A:
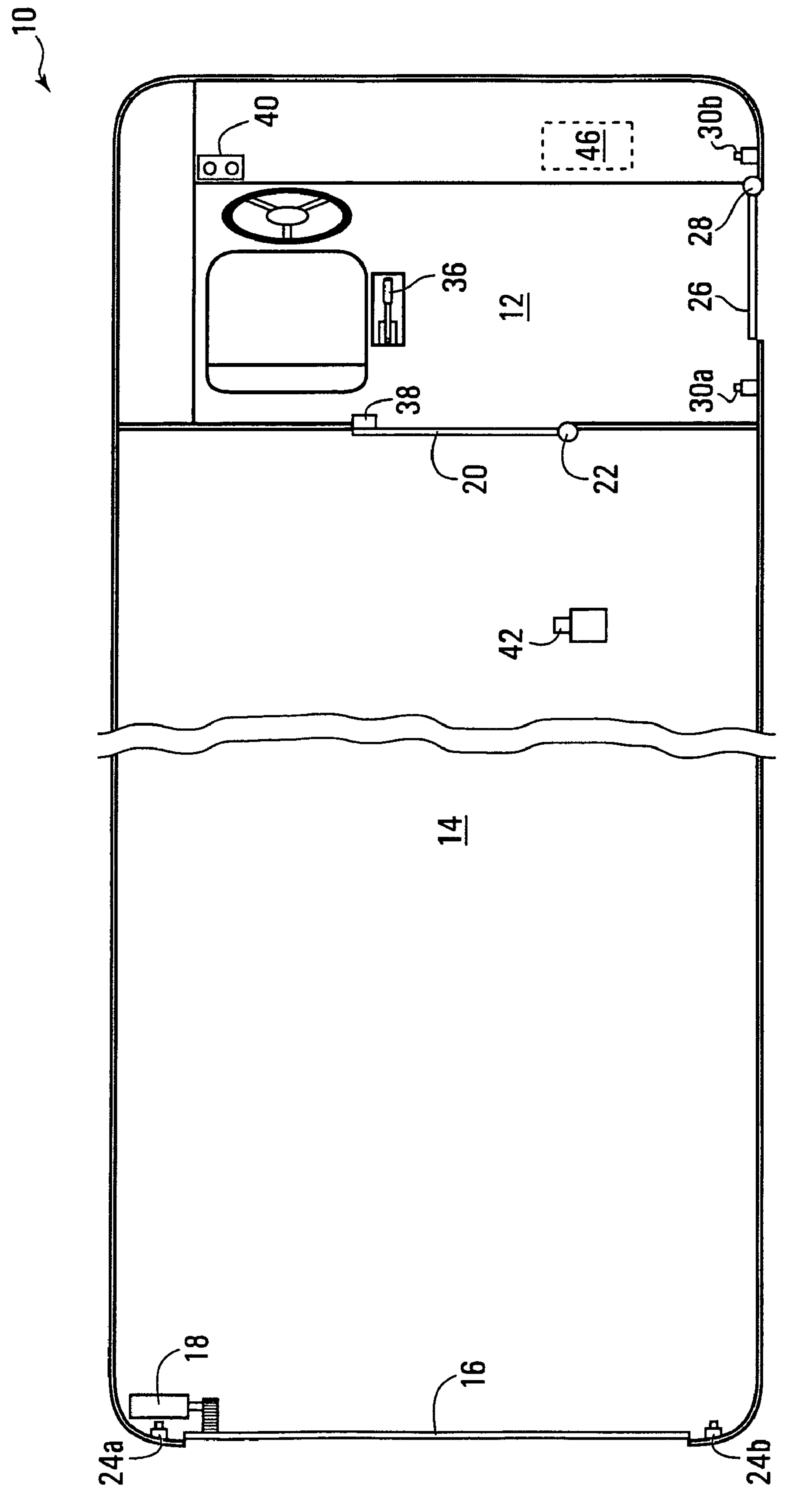
FIG. 1A is a schematic plan view of a delivery vehicle embodying an aspect of this invention.
Figure 1B:
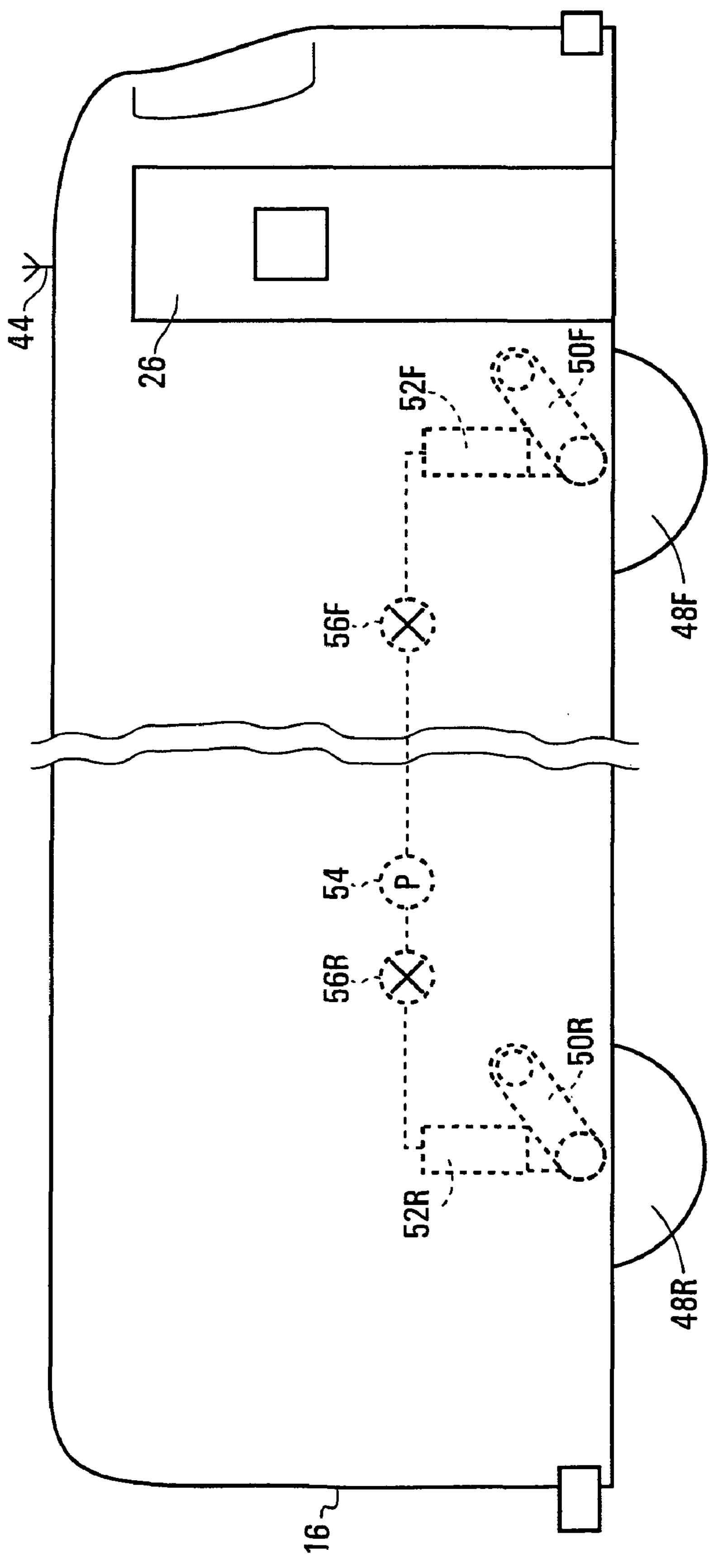
FIG. 1B is a schematic side view of the vehicle of FIG. 1A.

Turning to FIGS. 1A and 1B, a delivery vehicle 10 has an operator cab 12 and a cargo bay 14. The cargo bay has a rear loading door 16, which may be a roll-up door, operated by a motor 18 and a bulkhead door 20 which is biased to a closed position by a spring 22. Cab 12 may have an outwardly hinging side door 26 operated by a pneumatic valve 28. The bulkhead door may have an electromagnetic lock 38. Additionally, an electromagnetic latch 42 may be mounted in the vehicle in order to latch the bulkhead door open. Operator buttons 24*a*, 24*b* may be positioned on either side of the rear door 16 and operator buttons 30*a*, 30*b* may be positioned on either side of the side door 26. As is conventional, the operator cab 12 has a parking brake 36. Additionally, the cab may have an on-dash mode selector 40. The vehicle has a controller 46 and an antenna 44 positioned to receive wireless signals of a wireless key.

The front wheels 48*f* and rear wheels 48*r* of the vehicle 10 may have respective independent suspensions 50*f*, 50*r*. Each of these suspensions may be supported by an air bladder 52*f*, 52*r*. Valves 56*f*, 56*r* may selectively vent the air bladders or couple them to pressurised air from pump 54.

Figure 2:
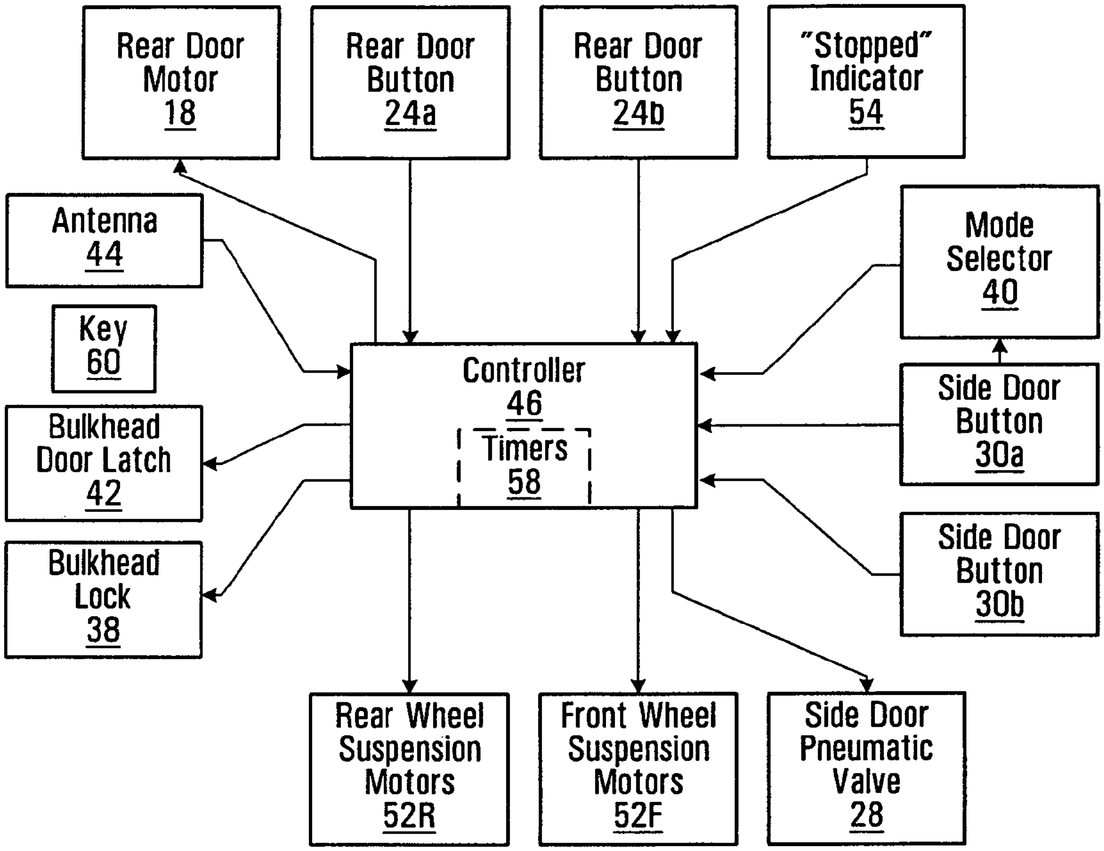
FIG. 2 is a block diagram showing electrical interconnections between elements.
Figure 3:
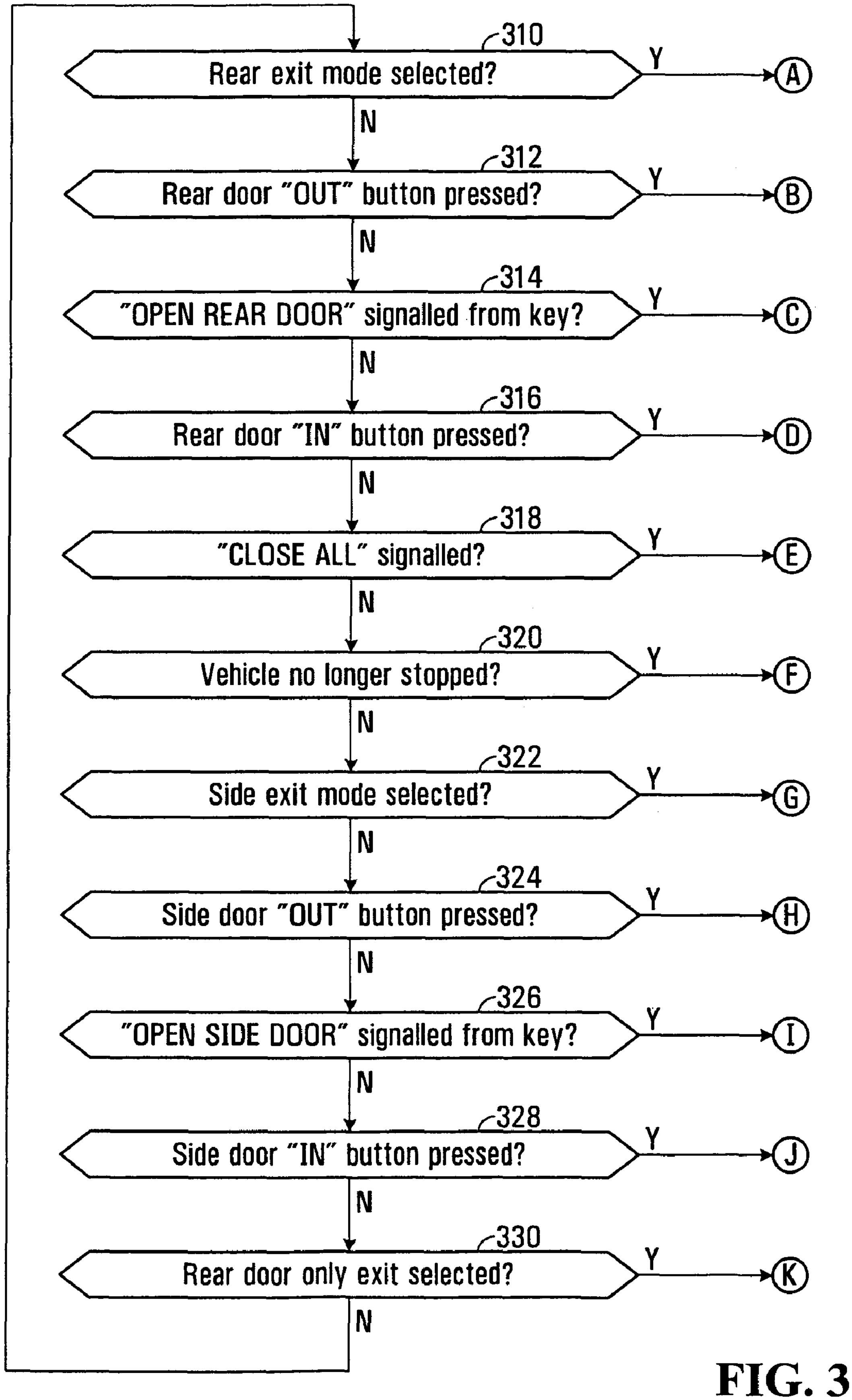
FIGS. 3 and 3A to 3K are flow diagrams illustrating operation of the system.
Figure 3A:
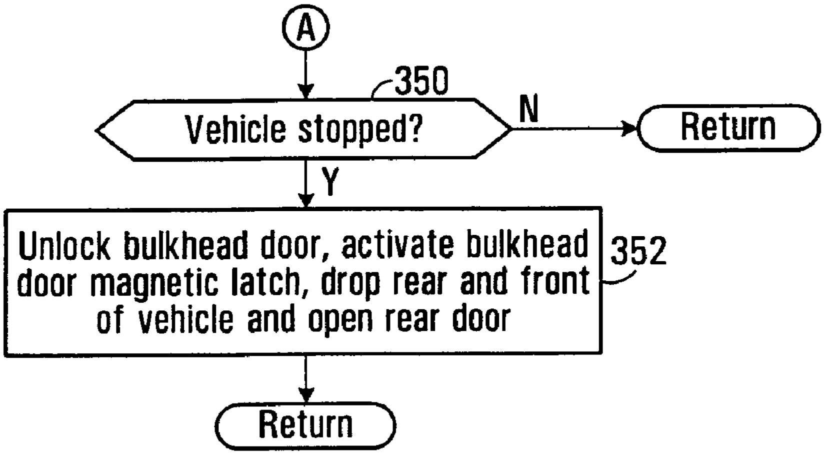
Figure 3B:
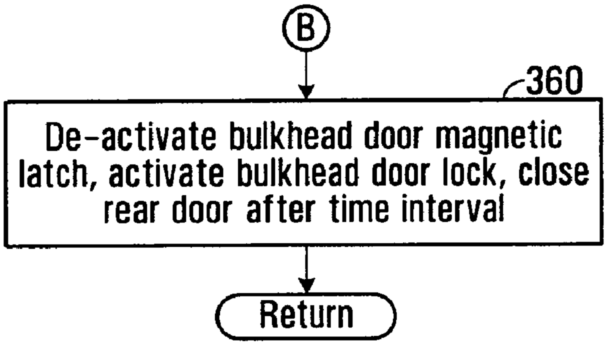
Figure 3C:
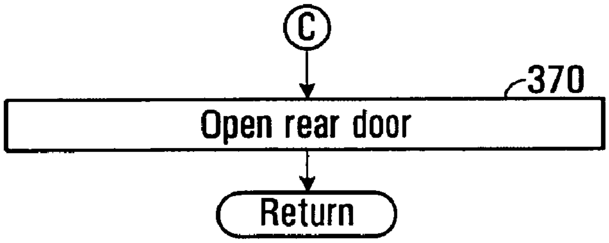
Figure 3D:
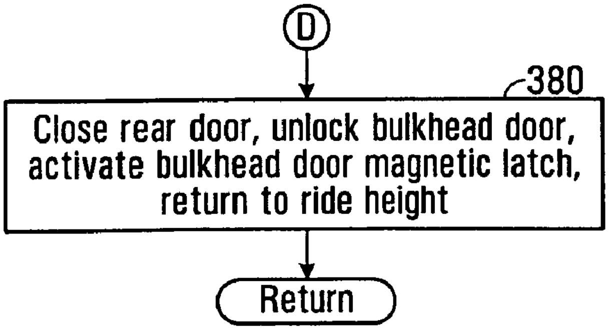
Figure 3E:
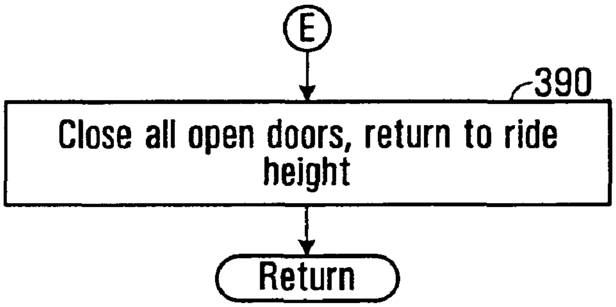
Figure 3F:
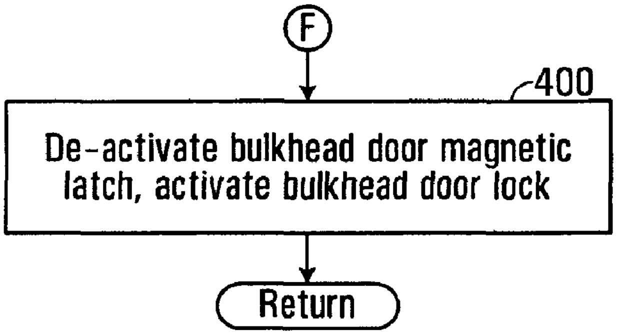
Figure 3G:
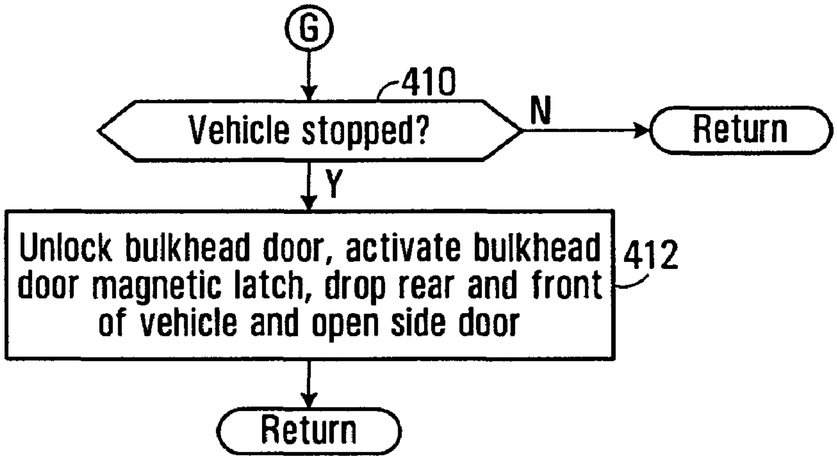
Figure 3H:
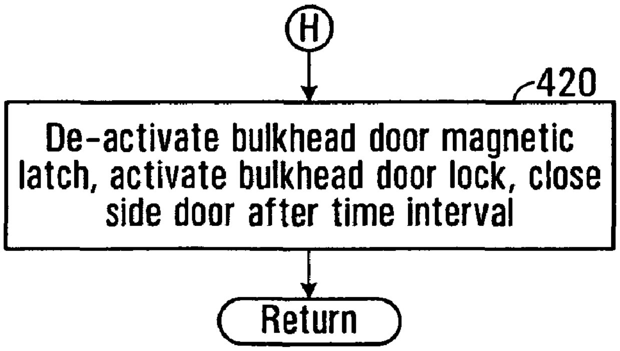
Figure 3I:
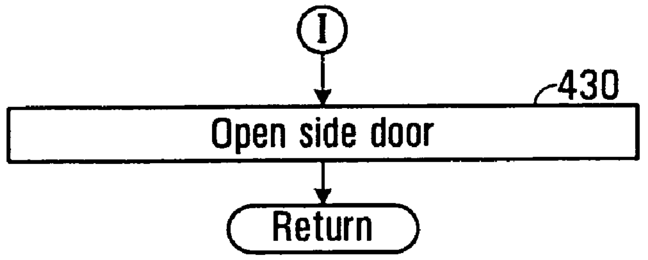
Figure 3J:
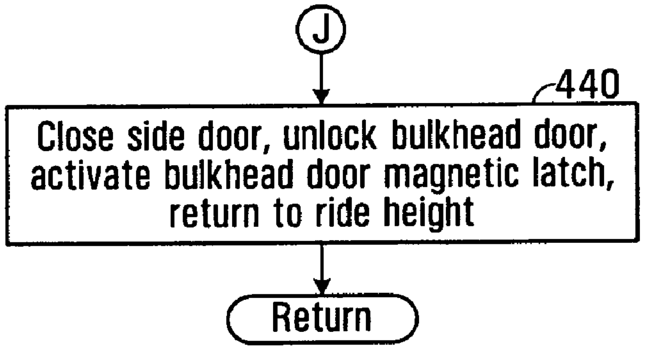
Figure 3K:
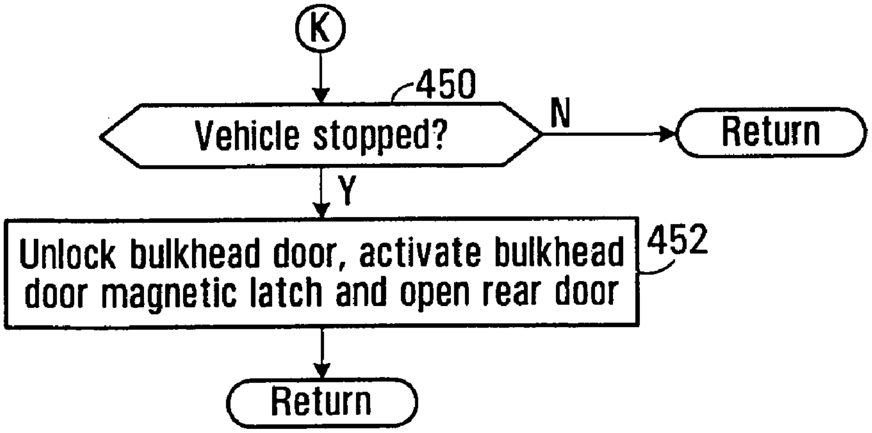

Referencing FIG. 2, controller 46 is connected to receive inputs from each of buttons 24*a*, 24*b*, 30*a*, 30*b*, mode selector 40, antenna 44, and a "stopped" indicator 54 associated with the parking brake 36 (FIG. 1A). Controller 46 is connected to output signals to rear door motor 18, bulkhead door lock 38, bulkhead door latch 42, side door pneumatic valve 28, and valves 56*f* and 56*r*. The controller has timers 58.

The controller may, for example, be a processor operating under software control or a configured field programmable gate array (FPGA). Motor 18 may be an electric motor operatively connected to a battery associated with the vehicle; each of valves 28, 56*f*, 56*r* may be an electric valve operatively connected to the vehicle battery. The electric motor 18 may have a three-way switch controlled by controller 46 such that the motor may be off or rotated in a clockwise or counter-clockwise direction. The mode selector may be controlled from operator actuatable controls to indicate a rear door exit mode, a side door exit mode, a rear door only mode, and a "close all" mode, amongst other possible modes.

A wireless key 60 may be carried by the operator. The key may have four buttons which correlate to the controls of the mode selector, i.e., a rear door exit mode button, a side door exit mode button, a rear door only mode button, and a "close all" button. The key may also have a transmitter to transmit a signal when a button on the key is pressed which signal indicates the button that was pressed. The antenna 44 is tuned to receive signals from the key 60, when the key is in range.

With reference to FIGS. 3, and 3A to 3K along with FIGS. 1A, 1B and 2, the operator, knowing the task required for the next destination on his route, may manually select an appropriate mode on mode selector 40 while en route. This may be, for example, the rear exit delivery mode. This mode indication inputs controller 46 (310). When the destination is reached, the operator may apply the parking brake 36. This causes a "stopped" indication to be received by the controller. On receiving the "stopped" indication (350), the controller may unlock the bulkhead door 20, activate the bulkhead door magnetic latch, drop the front and rear of the vehicle from ride height to delivery height, and open the rear door (352). To drop the vehicle from ride height, the controller controls valves 56*f* and 56*r* to empty the front and rear wheel air bladders 52*f*, 52*r* in order to retract suspensions 50*f*, 50*r*. This brings the body of the vehicle closer to the ground causing the vehicle to, in effect, lie down. The vehicle may be designed so that, when lying down, the rear end of the floor of the cargo bay is essentially at ground level and the floor at the side exit door is also essentially at ground level.

From the cab, the operator may push open the (now unlocked) bulkhead door until it is latched open by electromagnetic latch 42. The operator may then enter the cargo bay and load a number of boxes onto a hand cart which had been stowed in the cab, the cargo bay, or on the back of the vehicle. With the vehicle lying down, the operator is able to wheel the laden hand cart directly off the vehicle. On the way out, the operator may push the rear door out button 24*a* (312). This causes the controller to de-activate the bulkhead door magnetic latch, activate the bulkhead door magnetic lock and, after a pre-set time interval (measured by one of timers 58), close the rear door (360). The operator may now deliver the boxes. When returning with the hand cart the operator may press the "rear exit" button or "side exit" button on the portable key 60 (314, 326). If the key's transmitter is in range of antenna 44, this causes the requested door to open (370, 430). Where the cart is laden with new packages picked up at the site, the operator might normally signal the rear door to open so that he/she may wheel the new boxes directly into the cargo bay for stowage. After entering the vehicle through the rear door, the operator may press the rear door "in" button (316). This causes the controller to close the rear door, unlock the bulkhead door, activate the bulkhead door magnetic latch, and return the vehicle to ride height (380). On the other hand, where the cart is returned empty and is stowed in the cab, the operator might normally be expected to signal the side door to open. After entering the vehicle through the side door, the operator may press the side door "in" button (328). This causes the controller to close the side door, unlock the bulkhead door, activate the bulkhead door magnetic latch, and return the vehicle to ride height (440). When the controller senses the vehicle is no longer stopped (because the parking brake has been disengaged) (320), the controller de-activates the bulkhead door magnetic latch and activates the bulkhead door lock (400).

With the rear door open, rather than pressing the rear door "out" button when leaving the vehicle, or the rear door "in" button, when returning, the operator may press the "close all" button on the mode selector 40 or the key 60. The resulting "close all" signal to the controller (318) closes all open doors and returns the vehicle to ride height (390).

If, rather than selecting the rear door delivery mode, the operator had selected the side door delivery mode, then a side exit mode signal inputs controller 46 (322). When the destination is reached, the operator may apply the parking brake 36. This causes a "stopped" indication to be received by the controller. On receiving the "stopped" signal (410), the controller may unlock the bulkhead door 20, activate the bulkhead door magnetic latch, drop the front of the vehicle from ride height to delivery height, and open the side door (412). To drop the vehicle from ride height, the controller controls valves 56*f* to empty the front wheel air bladders 52*f* in order to retract suspensions 50*f*. This brings the front of the body of the vehicle closer to the ground causing the vehicle to, in effect, kneel down. The vehicle may be designed so that, when kneeling, the floor at the side exit door is essentially at ground level.

From the cab, the operator may push open the (now unlocked) bulkhead door until it is latched open by electromagnetic latch 42. The operator may then enter the cargo bay and retrieve a number of boxes. With the vehicle kneeling, the operator may be able to walk off the vehicle through the side door without negotiating any steps. On the way out, the operator may push the side door "out" button 30*a*. (324). This causes the controller to de-activate the bulkhead door magnetic latch, activate the bulkhead door magnetic lock and, after a pre-set time interval, close the side door (420). The operator may now deliver the boxes. When returning, the operator may press the "side exit" button or "rear exit" button on the portable key 60 (326, 314). If the key's transmitter is in range of antenna 44, this causes the requested door to open (430, 370). Where the operator returns hands-free or with few packages, the operator might signal the side door to open so that he/she may re-enter the cab through the side door. On the way in, the operator may press the side door "in" button (328). This causes the controller to close the side door, unlock the bulkhead door, activate the bulkhead door magnetic latch, and return the vehicle to ride height (440). In consequence, the operator may enter the cargo bay through the bulkhead door to stow any newly received packages. On the other hand, where the operator returns carrying one or more packages, the operator might signal the rear door to open (314, 370). After entering the vehicle through the rear door, the operator may press the rear door "in" button (316). This causes the controller to close the rear door, unlock the bulkhead door, activate the bulkhead door magnetic latch, and return the vehicle to ride height (380).

With the side door open, rather than pressing the side door "out" button when leaving the vehicle, or the side door "in" button, when returning, the operator may press the "close all" button on the mode selector 40 or the key 60. The resulting "close all" signal to the controller (318) closes all open doors and returns the vehicle to ride height (390).

The operator may select a "rear door only" mode on selector 40 such that a ":rear door only" mode signal inputs controller 46 (330). When the destination is reached, the operator may apply the parking brake 36. This causes a "stopped" indication to be received by the controller. On receiving the "stopped" signal (450), the controller may unlock the bulkhead door 20, activate the bulkhead door magnetic latch, and open the rear door (452). Thus, this mode is similar to the "rear exit" mode, except that the vehicle is not dropped from ride height. This mode may be appropriate where the operator backs up to a delivery dock which dock is above the level of the approachway. The operator may then push open the bulkhead door, collect packages for delivery from the cargo bay and walk, or wheel, the packages off through the rear door. On the way out, the operator could press the rear door "out" button to close the rear door (and close and re-lock the bulkhead door) (312, 360) and when returning, press the "rear exit" button on the key 60 to re-open the rear door (314, 370). After re-entering through the rear door, the operator may press the rear door "in" button, to cause the rear door to close (and unlock and energise the latch of the bulkhead door) (380).

With the "out" switch 30*a* and "in" switch 30*b* on opposite sides of the side door 26, an operator will readily learn to use his or her same hand to operate these switches. Specifically, as shown, the operator will use his or her right hand to operate switch 30*a* when facing door 26 from inside the cab 12 of the vehicle in order to signal leaving the vehicle and will use his or her right hand to operate switch 30*b* when entering door 26 from outside the vehicle 10 in order to signal his or her return to the vehicle. The same convention may be used for switches 24*a*, 24*b* positioned on opposite sides of the rear door 16. Other arrangements may of course be used. For example, switch 30*a* could be embodied in a pressure pad located on the floor of the cab 12 just inside door 26.

While activation of the exit modes of operation has been described as dependent upon a signal from engagement of the parking brake to indicate the vehicle is stopped, obviously other methods of indicating the vehicle is stopped may be used. For example, the vehicle may be considered to be stopped when an indication is received that the vehicle has been placed in park. Or the vehicle may be considered stopped when a switch under the driver's seat switches to indicate the driver has left the driver's seat. Or the mode selector 40 could have an off setting, in which case activation of a mode could simply be as a result of an operator switching the mode selector from the off setting to a selected mode. Also, a combination of these indications could be required before the vehicle was considered stopped.

In a variation of the described operation, when in rear exit delivery mode, controller 46 may, on receiving a "stopped" indication, drop the rear of the vehicle, but not the front of the vehicle.

While vehicle kneeling and lying down can further reduce operator strain, operator strain is nevertheless reduced by the sequenced operation of this invention even in the absence of the vehicle kneeling and lying down. Therefore, in a more simplified embodiment, vehicle 10 may be incapable of one or both of the operations of kneeling and lying down. Further, while the vehicle has been described as lying down in side door delivery mode, in an alternate embodiment, the vehicle could kneel to the front in this mode. In such instance, it would be expected that the operator would move packages into and out of the vehicle through the side door only (since it would no longer be possible to wheel packages through the rear door).

While, in the example embodiment, the vehicle 10 has a rear loading door 16 and a bulkhead door 20, other delivery vehicles may have different door configurations. Thus, for example, a delivery vehicle may have a door on both sides of the cargo bay and no bulkhead door. In such case, the mode of delivery may be selected to be via one or the other of the cargo bay side doors.

This invention also has application where there is only one mode of delivery, which mode may be selectively enabled or disabled as, for example, by providing a mode selector with an "off" position.

The timers of the controller could, of course, be separate timers.

The system of this invention may be installed in existing delivery vehicles as an after-market item (especially where the retracting suspensions are either not required or are already in place).

Other modifications will be apparent to those skilled in the art and, therefore, the invention is defined in the claims.

What is claimed is:

1. A vehicle with controlled door operation, comprising:

a vehicle exit door;

a drive for opening said exit door to create a passageway into said vehicle and closing said exit door to close said passageway;

at least one exit door opening user control for opening said exit door;

a first exit door closing user control within an interior of said vehicle at a first side of said exit door;

a second exit door closing user control within an interior of said vehicle at a second side of said exit door, said second side being opposite said first side;

a timer;

a controller input by said at least one exit door opening user control, said first exit door closing user control, said second exit door closing user control and said timer and outputting to said drive for:

responsive to receiving an indication from said at least one exit door opening user control, opening said exit door;

responsive to receiving an indication from said first exit door closing user control, closing said exit door after a time interval timed by said timer; and responsive to receiving an indication from said second exit door closing user control, closing said exit door without reference to said time interval timed by said timer.

2. The vehicle of claim 1 further comprising a bulkhead door with a remotely controllable lock and wherein said controller outputs to said lock and is also for, responsive to receiving an indication from said first exit door closing user control locking said bulkhead door lock and responsive to receiving an indication from said second exit door closing user control unlocking said bulkhead door lock.

3. The vehicle of claim 1 wherein said at least one door opening user control comprises a portable transmitter.

4. The vehicle of claim 1, further comprising:

a first user interface for setting an exit mode for said vehicle;

a second user interface for indicating said vehicle has stopped;

a third user interface for indicating an operator has left said vehicle;

and wherein said controller is input by said first user interface, said second user interface, and said third user interface and is also for:

on receipt of an indication from said first user interface of an exit mode and an indication from said second user interface that said vehicle has stopped, controlling said drive to open said exit door to create said passageway into said vehicle.

5. The vehicle of claim 4 further comprising an electromagnetic lock for a bulkhead door between a cab and a cargo bay of said vehicle and wherein said controller outputs to said electromagnetic lock, said controller for, on receipt of an indication from said first user interface of an exit mode and an indication from said second user interface that said vehicle has stopped, de-activating said electromagnetic lock.

6. The vehicle of claim 5 further comprising an electromagnetic latch to latch said bulkhead door open, said controller outputting to said electromagnetic latch, said controller for, after said indication of a side exit mode has been received and said indication said vehicle has stopped has been received, activating said electromagnetic latch.

7. The vehicle of claim 6 wherein said at least one exit door opening user control for opening said exit door comprises a wireless device and wherein said controller is for, on receipt of an exit door open signal from said wireless device, controlling said drive to open said exit door.

8. The vehicle of claim 4 further comprising a sub-system for dropping said vehicle from ride height and wherein said controller outputs to said sub-system and is further for, on receipt of an indication from said first user interface of an exit mode and an indication from said second user interface that said vehicle has stopped, controlling said sub-system to drop said vehicle from ride height.

9. The vehicle of claim 8 wherein said controller is further for, on receipt of a signal from said second exit door closing user control, closing said door and returning said vehicle to ride height.

* * * * *